W. H. KELLY.
Cultivator-Teeth.

No. 40,414.

Patented Oct. 27, 1863.

Witnesses:
A. L. Rawson
Geo. D. Cowley

Inventor:
W. H. Kelly

UNITED STATES PATENT OFFICE.

WILLIAM H. KELLY, OF BALDWINSVILLE, NEW YORK.

IMPROVEMENT IN CULTIVATOR-TEETH.

Specification forming part of Letters Patent No. 40,414, dated October 27, 1863.

*To all whom it may concern:*

Be it known that I, WILLIAM H. KELLY, of Baldwinsville, in the county of Onondaga and State of New York, have invented a new and Improved Tooth for Cultivators; and I do hereby declare that the following is a full and exact description thereof, reference being had to the accompanying drawings, and to the letters of reference marked thereon.

The nature of my invention consists in so shaping the cultivator-tooth that when it is attached to its shank and fastened in its proper place to the frame of the cultivator and the same is put in use the tooth shall have no tendency to slip by any grass or weeds that may be in its path, but shall cut them up completely, and at the same time thoroughly pulverize the soil through which it passes, and, in addition to this, be reversible upon its shank, so that either end of the tooth may be used.

To enable others skilled in the art to make and use my invention, I will proceed to describe its construction and operation.

Figure 3:
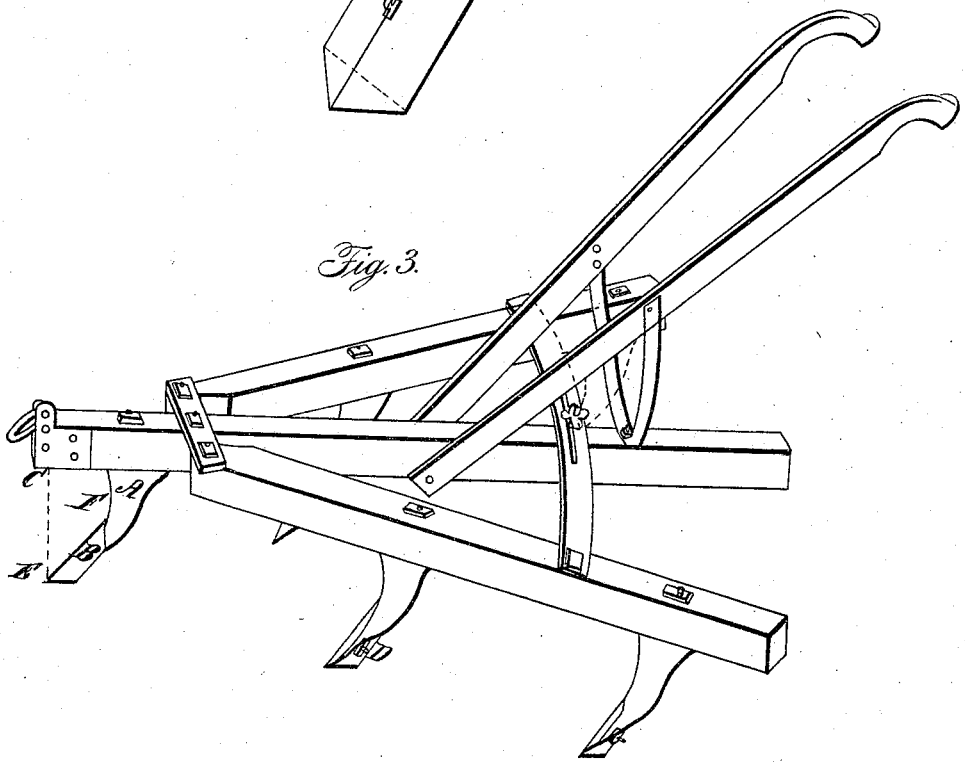

I construct the frame of my cultivator in any of the known forms, the one represented in Figure 3 being the most common. I also construct the shank (marked A, Fig. 1) in any of the known forms, to which I attach the tooth (marked B, Fig. 1) by means of a rectangular-headed bolt, (marked C, Fig. 1,) which passes through the center of the tooth and then through the shank, and is fastened by a nut upon the back of the shank, as shown in Fig. 3 by letter D.

Figure 1:
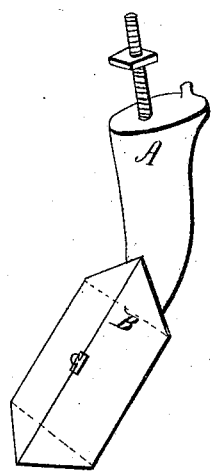

I prefer that the shank A, Fig. 1, should be so constructed that when it is fastened in its place to the frame of the cultivator a line drawn from the lower point of the tooth B to its upper point shall form an angle of about forty-five degrees with a perpendicular let fall from the frame of the cultivator, so as to pass through the lower point of the tooth B, as shown in Fig. 3, in which A is the shank in place, B the tooth, and E F a line drawn from the lower to the upper point of the tooth B, making an angle of about forty-five degrees with the perpendicular E G, let fall from the frame through the lower point of the tooth B.

Figure 2:
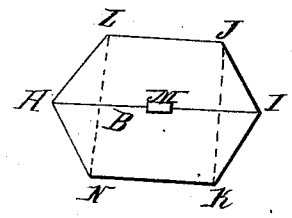

In constructing the tooth B, Fig. 1, I take a piece of sheet-steel of any required thickness and of any required width, generally from five to six inches, and of any required length, generally about eight inches. I then commence at the middle of each end and clip off the corners at any desired angle, each way from said middle point, thus forming an irregular hexagon having its opposite sides equal, as shown in Fig. 2. I then punch a hole through the center (marked M, Fig. 2) and fit it to receive the head of the rectangular-headed bolt (marked C, Fig. 1) by which it is fastened to the shank. I then bend this hexagonal-shaped piece of steel along the line H L, Fig. 2, by bringing the two sides L J and N K, Fig. 2, toward each other, so that when these two sides L J and N K are placed upon a plane surface the line H I will be raised above the same surface about one inch for every six inches between said two sides. It will readily be seen that this tooth B, Fig. 1, is reversible upon the shank A, Fig. 1, and that when one of the points becomes worn it can be reversed and the other point brought into use.

I do not claim as my invention the cultivator-frame or the shank; but

What I do claim as my invention, and desire to secure by Letters Patent, is—

The tooth, (or, as it is sometimes called, the point,) of the form and shape, and constructed essentially as above described.

WM. H. KELLY.

Witnesses:
GEO. D. COWLES,
A. L. RAWSON.